Feb. 23, 1960
J. P. SQUIER
2,926,059
CHART CHANGERS FOR RECORDING INSTRUMENTS
Filed June 13, 1956
2 Sheets-Sheet 1
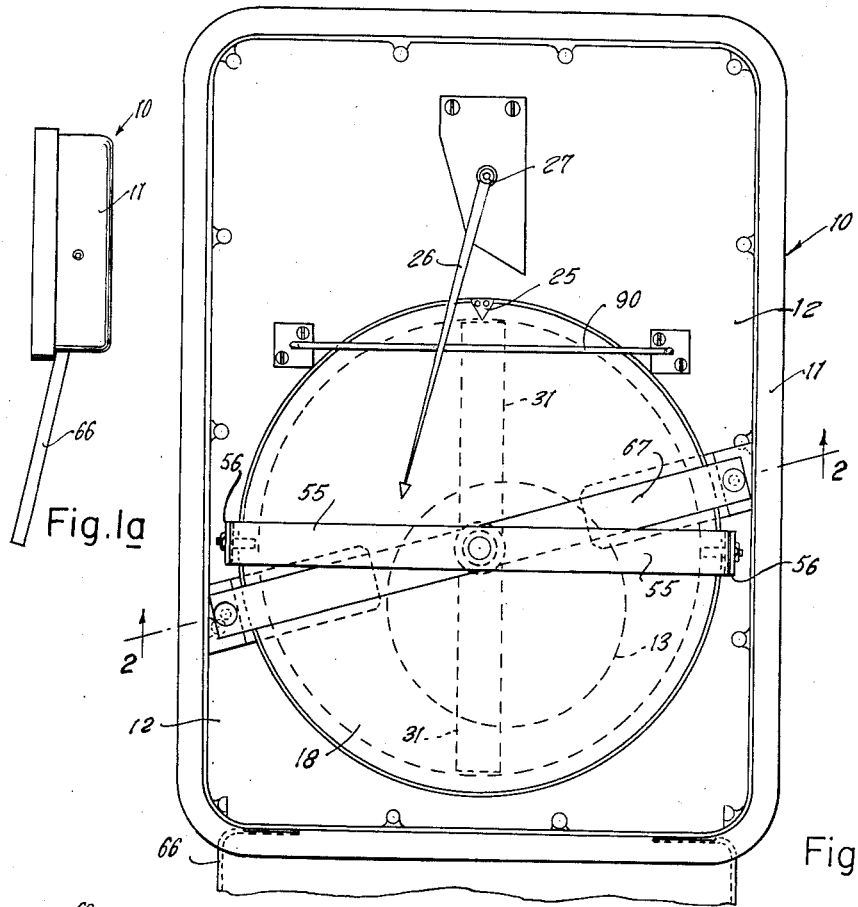
Fig. 1a
Fig. 1
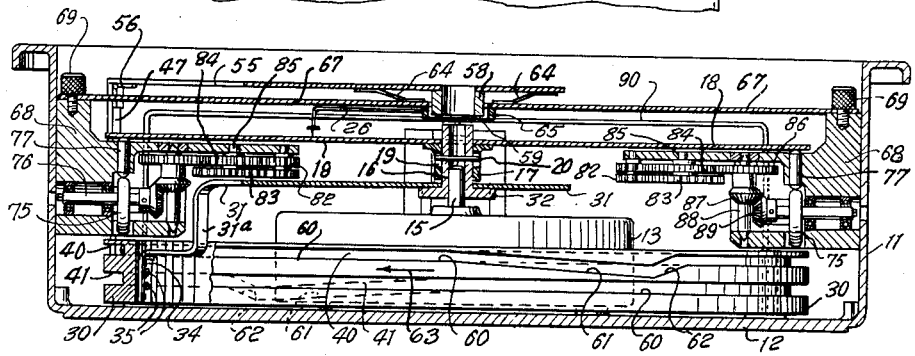
Fig. 2
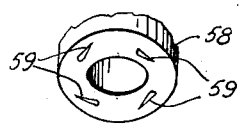
Fig. 2a
INVENTOR
John P. Squier
BY
ATTORNEY Feb. 23, 1960 J. P. SQUIER 2,926,059
CHART CHANGERS FOR RECORDING INSTRUMENTS
Filed June 13, 1956 2 Sheets-Sheet 2

INVENTOR
John P. Squier

BY
ATTORNEY

United States Patent Office 2,926,059
Patented Feb. 23, 1960

2,926,059

CHART CHANGERS FOR RECORDING INSTRUMENTS

John P. Squier, Dallas, Tex.

Application June 13, 1956, Serial No. 591,052

19 Claims. (Cl. 346—137)

This invention relates to recording instruments and more particularly to a chart changer for recording instruments.

Recording instruments such as flow meters, pressure recording instruments, demand meters and the like, using circular disc paper charts upon which a pen records variations in value of the characteristic being indicated, have been in common use for many years. The charts used may serve to record variations of the characteristics indicated during varying periods of time, such as eight hour periods, twelve hour or twenty-four hour periods, or seven day periods or the like. In any case, it has been necessary that an operator or meter man attend each instrument at the required intervals of time to manually change the chart at such intervals. While some efforts have been made to use an elongate helical spiral chart or split circular disc charts in the past, such devices have not proved satisfactory.

The present invention is directed to a chart changing mechanism for automatically changing circular disc charts at predetermined desired intervals of time, whereby a number of such charts may be mounted in an instrument for successively recording variations of the indicated characteristic or characteristics during a relatively great number of intervals, such as for a thirty day period, whereby the instrument need be attended by the operator only at such greater intervals of time and a single operator may thereby service and attend to a greater number of instruments.

An object of this invention, therefore, is to provide a new and improved recording instrument having an automatic chart changer.

Another object is to provide a recording instrument having a rotatable chart plate for carrying a plurality of superposed charts and a chart changer for removing the outermost chart from the chart plate at periodic intervals.

Still another object is to provide a recording instrument of the type described, wherein the chart changer includes means for periodically engaging the outermost chart to remove it from the chart plate.

A further object is to provide a new and improved recording instrument, of the type described, wherein means are provided periodically to move the chart plate toward the chart engaging means whereby the outermost chart is always positioned at the proper distance from the chart engaging means as the number of charts on the chart plate diminishes due to the operation of the chart changer.

Another object of the invention is to provide a recording instrument, of the type described, wherein the drive means for rotating the chart plate also affects the operation of the chart changing means.

A further object of the invention is to provide in recording instrument of the character described a chart changing mechanism for removing the outermost of a plurality of superposed charts at periodic intervals and dropping the chart on removal into a storage container for removed charts, said removed charts moving by gravity into such container and said container being disposed to receive and retain said charts in order of removal.

Additional objects and advantages of the invention will be readily apparent from the reading of the following description of a device constructed in accordance with the invention, and reference to the accompanying drawings thereof, wherein:

Figure 1 is a vertical face view of a recording instrument provided with a chart changer embodying the invention, and showing the upper portion of a chart container attached thereto;

Figure 1a is a reduced side elevation of the recording instrument and chart receptacle for removed charts;

Figure 2 is a sectional view taken on the line 2—2 of Figure 1;

Figure 2a is an enlarged fragmentary perspective of the lower end of the pick-off head and needles;

Figure 3:
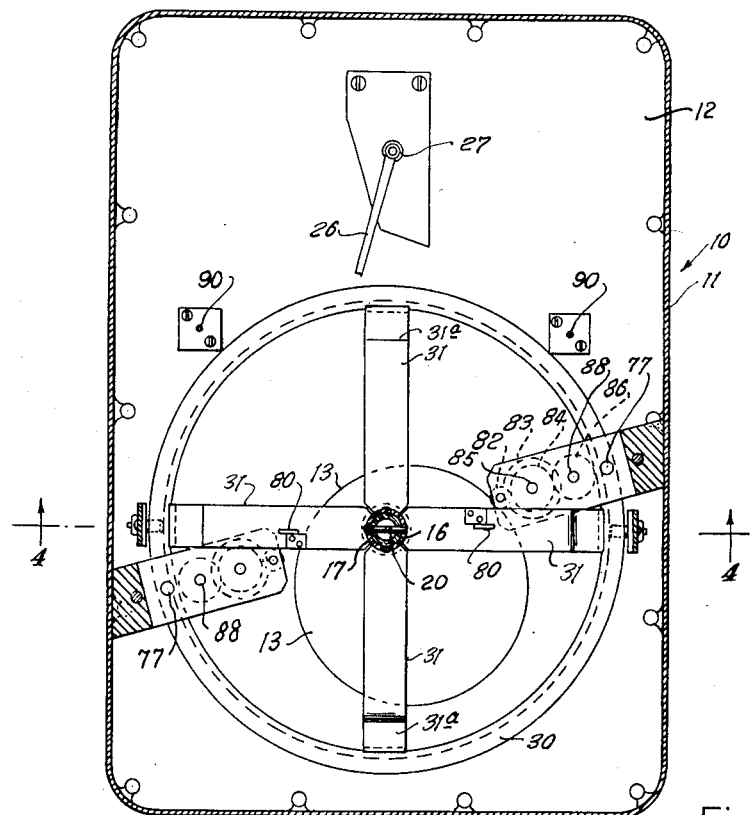
Figure 3 is a sectional view taken on line 3—3 of Figure 4.
Figure 4:
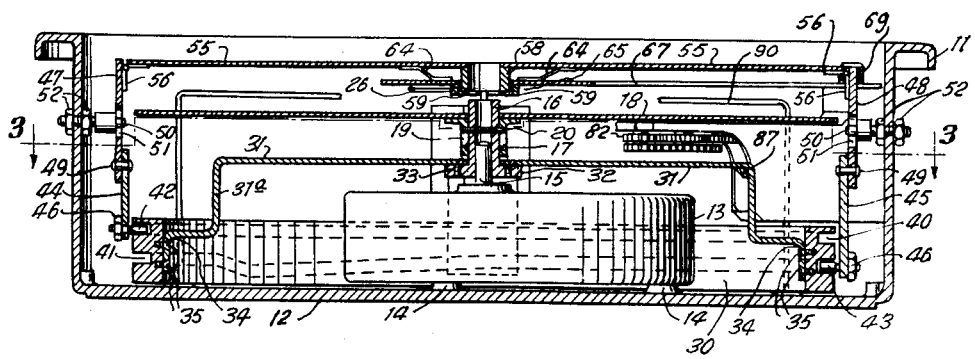
Figure 4 is a sectional view taken on line 4—4 of Figure 3.

Referring now to the drawings, the recording instrument 10 includes a case 11 on whose rear wall or side 12 is secured a driving means or motor 13. The motor 13 may be secured to the wall of the case by bolts 14 or in any other suitable means.

The motor 13 has a drive shaft 15 on which is rigidly mounted, as by a friction fit, a drive sleeve or hub 16. Slidingly telescoped on the sleeve 16 for limited longitudinal movement thereon is a central bearing or slidable sleeve 17 of the chart plate 18. The central bearing 17 has longitudinal slots 19 in which are disposed the ends of thet ransverse pin 20 extending through the hub 16, whereby the pin limits the longitudinal movement of the central bearing on the drive sleeve 16. The motor may be driven electrically or may be of the spring driven type.

The chart plate is provided at its peripheral edge with a chart drive pin 25 which is received in aligned peripheral notches of a stack of charts, not shown, to insure that the stack of charts rotates with the chart plate. The charts are, of course, provided with a central aperture through which the drive sleeve or hub 16 projects.

The recording instrument is also provided with a pivotally mounted pen 26 mounted on and driven by a suitable shaft 27 projecting into the case 11 through the rear wall 12. The driving means or shaft 27 moves the pen in accordance with the variations of a characteristic such as temperature, pressure or velocity.

A cam ring 30 is disposed about the drive means 13 and below the chart plate 18 and is connected to the drive sleeve 16 by means of a plurality of radially extending supporting straps 31. The inner ends of the straps 31 rest on an external annular flange 32 on the inner end of the drive sleeve 16 and are secured thereto by screws 33. The outer portions of the straps are formed with rearward offsetting portions or arms 31a and the outer ends 34 of said straps 31 abut the inner surface of the cam ring and are secured thereto by screws 35. It will be apparent that since both the cam ring and the chart plate are connected to the drive shaft 15 of the drive means 13 by the drive sleeve, the cam ring is rotated at the same speed as, and simultaneously with, the chart plate.

The cam ring is provided with a pair of external annular cam grooves 40 and 41 in which are disposed a pair of cam follower pins 42 and 43, respectively. The cam follower pins 42 and 43 have threaded reduced outer ends secured to the lower ends of links 44, 45, respectively, by nuts 46. The upper ends of the links 44 and 45 are connected to outer links 47 and 48, respectively, by rivets 49. The outer links are slidably supported and guided by means of pins 50 which extend into elongate slots 51 formed in said upper links. The pins 50 have threaded outer portions and are secured to the wall of the case 11 by nuts 52.

A pick-off bar 55 extends diametrically across the chart plate and is secured at its opposite ends to the upper ends of the upper links 47 and 48 by hinges 56. A cylindrical pick-off head 58 is mounted centrally of the inner side of the pick-off bar and is adapted to telescope over the outer end of the drive sleeve when the pick-off bar is moved toward the chart plate. Pick-off needles 59 extend angularly from the pick-off head and angularly toward the chart plate outwardly of the drive sleeve, whereby the needle may engage and penetrate a chart on the chart plate when the pick-off bar is moved toward the plate.

The pick-off bar is moved first toward and then away from the chart plate during each revolution of the chart plate by the action of the cam pins 42 and 43 riding in the cam grooves 40 and 41, respectively, of the cam ring 30. Each of the cam grooves 40 and 41 has a straight portion 60 disposed parallel to the chart plate, a gradually inclined portion 61 extending from one end of the straight portions 60 and away from the chart plate, and a steeply inclined portion 62 extending from the end of the inclined portion 61 to the other end of the straight portion 60 and toward the chart plate.

It will be apparent that, as the chart plate and the cam ring are rotated in the direction indicated by the arrow 63, Figure 2, the cam pins are first located in the straight portions 60 of the grooves 40 and 41 and the pick-off bar 55 is held stationary as the chart plate 18 revolves. When the cam ring 30 rotates to a point where the cam pins 42 and 43 enter the gradually inclined portions 61 of the grooves, the engagement of the pins in the grooves pulls the links 44 and 45 toward the back wall 12 of the case and causes the pick-off bar to gradually move inwardly toward the chart plate. As the pick-off bar 55 approaches the outermost chart on the chart plate, the pick-off needles 59 engage and then penetrate into the outermost chart. At this point the cam pins enter into the steeply inclined portion 62 of the cam grooves and the pick-off bar is moved rapidly away from the chart plate by leaf springs 64 on the inner side of the pick-off bar engaging a transverse strip-off bar 67. This outward movement of the pick-off bar causes the outermost chart to be pulled outwardly by the pick-off needles off the drive sleeve 16. As the pick-off bar continues to move away from the chart plate, the chart engages a strip-off ring 65 disposed about the pick-off head and is thus pulled off the pick-off needles to fall downwardly into a chart container 66 which is mounted below the recorder case 11, the open bottom of the recorder case and the open top of the chart container having registering apertures through which the chart falls. The strip-off ring 65 is mounted on the strip-off bar 67 which is secured at its opposite ends to brackets 68 by means of knurled screws 69.

The pick-off needles are always moved inwardly to the same position with respect to the chart plate 18 by the cam grooves, so that it is necessary, after each chart is removed, to move the chart plate 18 outwardly toward the strip-off bar, a distance equal to the thickness of a chart once during each revolution of the chart plate so that the outermost chart will always be properly positioned to be engaged by the pick-off needles. The slot 19 and pin 20 connection of the chart plate to the drive sleeve permits such movement of the chart plate.

The chart plate is moved outwardly once during each revolution of the chart plate a distance equal to the thickness of a chart by a pair of cams 75 fixed on shafts 76 which are rotatably mounted in the brackets 68. Cam followers 77 slidably mounted in the brackets 68 have rounded opposite ends which engage the cams and the rear surface of the chart plate, respectively. The cam followers are moved outwardly as the cams are revolved to move the chart plate outwardly toward the strip-off bar.

The shafts 76 of the cams are rotated a predetermined degree during each revolution of the chart plate by pawls 80 mounted on the straps 31. The pawls engage the teeth of gears 82 rotatably mounted on the brackets 68 to rotate the gears 82 a predetermined degree once during each revolution of the chart plate. The gears 82 are connected to the shaft 76 of the cams 75 by a gear train which includes gears 83 and 84 rigidly mounted on the shafts 85, a gear 86 and a bevel gear 87 mounted on the shaft 88, and a bevel gear 89 rigidly mounted on the cam shaft 76.

It will be apparent that, during each revolution of the chart plate, the pawls 80 engage the gears 82 and rotate them a predetermined distance, which causes the shafts 76 to be rotated a predetermined distance. Such rotation of the shafts 76 rotates the cams 75 and causes the followers 77 to move outwardly to move the chart plate toward the stripper bar a distance equal to the thickness of a chart.

A guide bar 90 may be positioned across the upper portion of the chart plate to guide the charts as they are removed from the drive sleeve and fall into the chart container.

As the charts are individually removed from the chart plate they fall into the chart container and are positioned in the proper sequence therein so that when a group of charts is removed from the container, the outermost chart will be the one last removed from the chart plate. This result is attained by disposing the container in an inclined position with respect to the vertical, so that the charts falling into the container will be on top of the previously removed charts. If desired, the charts may be sequentially marked by numbers, letters or other indicia so that each chart can be identified as to what period of time of operation of the recording instrument it represents.

The cam shafts 76 may have openings for keys or handles provided in the wall of the case 11 whereby the location of the chart plate can be manually adjusted to reset the cams when a new stack of charts is mounted on the chart plate.

It will now be seen that a new and improved chart changer for recording instruments has been illustrated and described which includes a chart plate 18 having a center post or sleeve 16 on which a stack or plurality of superposed charts may be mounted, a pick-off bar 55 movable once during each revolution of the chart toward and away from the chart plate, pick-off means comprising the head 58 and needles 59 mounted on the pick-off bar for engaging the outermost chart and removing it from the chart plate post, and a strip-off means 65 for removing the chart from the pick-off means to free it for movement to a chart container. The chart changer also includes means for moving the chart plate a distance equal to the thickness of a chart toward the strip-off bar once during each revolution of the chart plate.

It will also be seen that the pick-off needles 59 are disposed angularly with respect to the charts, whereby a chart will tend to remain on the needles as the needles are moved away from the chart plate.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A chart changer for a recording instrument including: a rotatable chart plate disposed for rotation about a substantially horizontal axis on which a stack of flexible charts may be disposed; means for mounting a stack of charts on said chart plate; means disposed adjacent said chart plate for successively completely freeing individual charts of a stack of charts disposed on the chart plate from the mounting on said chart plate to fall free from the plate by gravity; drive means for the chart plate and said means for freeing the charts, said chart plate and said freeing means being movable relative to one another about said horizontal axis by said drive means; means operated by said drive means actuating said freeing means to free a chart each time a predetermined relative movement occurs between the chart plate and the means for freeing individual charts.

2. A chart changer for a recording instrument including a rotatable chart plate disposed in a vertical plane for rotation about a horizontal axis on which a stack of flexible charts may be disposed; pick-off means disposed adjacent said chart plate and movable toward and away from the chart plate for penetrating and holding the outermost chart of the stack of charts and removing it completely from the chart plate; and means operable once during each revolution of the chart plate for moving said pick-off means toward and away from the chart plate, said pick-off means including a pick-off bar mounted adjacent and across the chart plate and having a head provided with angularly disposed needles extending toward the chart plate.

3. A chart changer for a recording instrument including a rotatable chart plate disposed in a vertical plane for rotation about a horizontal axis on which a stack of flexible charts may be disposed; pick-off means disposed adjacent said chart plate and movable toward and away from the chart plate for penetrating and holding the outermost chart of the stack of charts and removing it from the chart plate; means operable once during each revolution of the chart plate for moving said pick-off means toward and away from the chart plate; and strip-off means for engaging a chart held by the pick-off means and stripping it off the pick-off means to free it completely from said chart plate for falling movement by gravity away from the chart plate as the pick-off means approaches the limit of its movement away from the chart plate, said pick-off means including a pick-off bar mounted adjacent and across the chart plate and having a head provided with angularly disposed needles extending toward the chart plate.

4. A chart changer for a recording instrument including a rotatable chart plate disposed in a vertical plane and rotatable about a horizontal axis on which a stack of flexible charts may be disposed; pick-off means disposed adjacent said chart plate and movable toward and away from the chart plate for penetrating and holding the outermost chart of the stack of charts and removing it completely from the chart plate; and means operable once during each revolution of the chart plate for moving said strip-off means toward and away from the chart plate, said pick-off means including a pick-off bar mounted adjacent and across the chart plate and having a head provided with angularly disposed needles extending toward the chart plate; and strip-off means for engaging a chart held by said pick-off means and releasing it from said pick-off means whereby said chart may fall by gravity away from the chart plate, said strip-off means including a ring disposed about said pick-off head whereby the needles are disposed within the ring as the head approaches the limit of its movement away from the chart plate.

5. A chart changer for a recording instrument including a rotatable chart plate disposed in a vertical plane and rotatable about a horizontal axis on which a stack of flexible charts may be disposed; pick-off means disposed adjacent said chart plate and movable toward and away from the chart plate for penetrating and holding the outermost chart of the stack of charts and moving it from the chart plate; means operable once during each revolution of the chart plate for moving said pick-off means toward and away from the chart plate; and strip-off means for engaging a chart held by the pick-off means and stripping it off the pick-off means to free it for falling movement by gravity away from the chart plate as the pick-off means approaches the limit of its movement away from the chart plate, said pick-off means including a pick-off bar mounted adjacent and across the chart plate and having a head provided with angularly disposed needles extending toward the chart plate; said strip-off means including a ring disposed about said pick-off head, whereby the needles are disposed within the ring as the head approaches the limit of its movement away from the chart plate.

6. A chart changer for recording instruments including: a rotatable chart plate disposed for rotation about a substantially horizontal axis on which a stack of flexible charts may be disposed; means for mounting charts on said chart plate; means disposed adjacent said chart plate for successively completely freeing individual charts of a stack of charts disposed on the chart plate from the chart plate to fall free from said plate by gravity; drive means for the chart plate and said means for freeing the charts, said chart plate and said freeing means being movable relative to one another about said horizontal axis by said drive means; means operated by said drive means actuating said freeing means to free a chart each time a predetermined relative movement occurs between the chart plate and the means for freeing individual charts; and means for moving the chart plate toward the freeing means for positioning the outermost chart in position to be freed by the actuation of the freeing means.

7. A chart changer for a recording instrument including a rotatable chart plate disposed in a vertical plane and rotatable about a horizontal axis on which a stack of flexible charts may be disposed; pick-off means disposed adjacent said chart plate and movable toward and away from the chart plate for engaging and holding the outermost chart of the stack of charts and removing it from the chart plate; means operable once during each revolution of the chart plate for moving said pick-off means toward and away from the chart plate; strip-off means for engaging a chart held by the pick-off means and stripping it off the pick-off means to free it for movement by gravity away from the chart plate as the pick-off means approaches the limit of its movement away from the chart plate; and means for moving the chart plate a predetermined distance toward the pick-off means during each revolution of the chart plate.

8. A chart changer for a recording instrument including a rotatable chart plate disposed in a vertical plane and rotatable about a horizontal axis on which a stack of flexible charts may be disposed; pick-off means disposed adjacent said chart plate and movable toward and away from the chart plate for engaging and holding the outermost chart of the stack of charts and removing it from the chart plate to position said outermost chart for falling movement away from the chart plate; means operable once during each revolution of the chart plate for moving said pick-off means toward and away from the chart plate; said pick-off means including a pick-off bar mounted adjacent and across the chart plate and having a head provided with angularly disposed needles extending toward the chart plate; and means for moving the chart plate a predetermined distance toward the pick-off means during each revolution of the chart plate.

9. A chart changer for a recording instrument including a rotatable chart plate disposed in a vertical plane and rotatable about a horizontal axis on which a stack of flexible charts may be disposed; pick-off means disposed adjacent said chart plate and movable toward and away from the chart plate for engaging and holding the outermost chart of the stack of charts and removing it from the chart plate; means operable once during each revolution of the chart plate for moving said pick-off means toward and away from the chart plate; strip-off means for engaging a chart held by the pick-off means and stripping it off the pick-off means to free it for falling movement by gravity away from the chart plate as the pick-off means approaches the limit of its movement away from the chart plate; said pick-off means including a pick-off bar mounted adjacent and across the chart plate and having a head provided with angularly disposed needles extending toward the chart plate; and means for moving the chart plate a predetermined distance toward the pick-off means during each revolution of the chart plate.

10. A device including: a chart plate; drive means for rotating the chart plate; chart pick-off means disposed adjacent said chart plate and movable toward and away from the chart plate for engaging and holding a chart disposed on the chart plate and removing it therefrom; and means connecting said pick-off means to said drive means, whereby said drive means actuates said pick-off means once during each revolution of said chart plate, said connecting means comprising: a cam ring rotatable by said drive means and having a peripheral continuous groove, and a cam pin connected to said pick-off means and engaged in said groove, said groove having portions inclined away from and toward said chart plate, whereby the pick-off means moves toward and away from the chart plate with said cam pin as said cam ring rotates.

11. A device including: a chart plate; drive means for rotating the chart plate; chart pick-off means disposed adjacent said chart plate and movable toward and away from the chart plate for engaging and holding a chart disposed on the chart plate and removing it therefrom; means connecting said pick-off means to said drive means, whereby said drive means actuates said pick-off means once during each revolution of said chart plate; and means operable by said drive means for moving the chart plate a predetermined distance toward the pick-off means during each revolution of the chart plate, said means for moving said chart plate toward the pick-off means including a cam, a follower having opposite ends engaging said cam and said chart plate; means for periodically actuating said cam to move said follower and the chart plate toward the pick-off means; and means for connecting said last mentioned means to said drive means.

12. A chart changer for a recording instrument including: a rotatable chart plate disposed for rotation about a substantially horizontal axis on which a stack of flexible charts may be disposed; means for mounting charts on said plate; means disposed adjacent said chart plate for successively completely freeing individual charts of a stack of charts disposed on the chart plate from the chart plate; drive means for the chart plate and said means for freeing the charts, said chart plate and said freeing means being movable relative to one another about said horizontal axis by said drive means; means operated by said drive means actuating said freeing means to free a chart each time a predetermined relative movement occurs between the chart plate and the means for freeing individual charts; and a chart receptacle disposed below said chart plate for receiving charts freed from the chart plate.

13. A chart changer for recording instruments including: a rotatable chart plate disposed for rotation about a substantially horizontal axis on which a stack of flexible charts may be disposed; means for mounting a stack of charts on said plate; means disposed adjacent said chart plate for successively completely freeing individual charts of a stack of charts disposed on the chart plate from the chart plate to fall free by gravity; drive means for the chart plate and said means for freeing the charts, said chart plate and said freeing means being movable relative to one another about said horizontal axis by said drive means; means operated by said drive means actuating said freeing means to free a chart each time a predetermined relative movement occurs between the chart plate and the means for freeing individual charts; means for moving the chart plate toward the freeing means for positioning the outermost chart in position to be freed by the actuation of the freeing means; and a chart receptacle disposed below said chart plate for receiving charts freed from the chart plate.

14. A device including: a chart plate; drive means for rotating the chart plate; means for supporting charts on said chart plate; chart pick-off means disposed adjacent said chart plate and movable toward and away from the chart plate for engaging and holding a chart disposed on the chart plate and removing it completely from said support means and said chart plate; means connecting said pick-off means to said drive means, whereby said drive means actuates said pick-off means once during each revolution of said chart plate; and strip-off means for engaging a chart held by the pick-off means and completely freeing it from the pick-off means for falling movement away from the chart plate as the pick-off means approaches the limit of its movement away from the chart plate; said chart plate having a chart drive means; said charts having peripheral outwardly opening slots for releasably receiving said chart drive means.

15. A device including: a case; a chart plate mounted in the case for rotation about a substantially horizontal axis; means for mounting charts on said plate; drive means for rotating the chart plate; freeing means disposed adjacent said chart plate and operable by the drive means upon a predetermined relative movement between said chart plate and said freeing means to completely free successively individual charts of a stack of charts disposed on the chart plate from said mounting means to fall by gravity in the case; said chart plate and said freeing means being movable relative to one another about said horizontal axis by said drive means; means operated by said drive means actuating said freeing means to completely free successively individual charts from said plate; and a chart receptacle mounted on the case and open at its upper end into the interior of said case disposed to receive the freed charts.

16. A device including: a case; a chart plate mounted in the case for rotation about a substantially horizontal axis; drive means for rotating the chart plate, the chart plate being adapted to carry a stack of individual charts having central apertures and peripheral slots, said chart plate having a drive pin receivable in said peripheral slots and a central post receivable in said central apertures; means operable by the drive means and disposed adjacent said chart plate for successively completely freeing each time a predetermined relative movement between the chart plate and said freeing means occurs individual charts from a stack of charts carried by said chart plate from engagement with said post and said drive pin to fall by gravity in the case; said chart plate and said freeing means being movable relative to one another about said horizontal axis by said drive means; and a chart receptacle mounted on the case and open at its upper end into the interior of the case and disposed to receive the charts from the chart plate.

17. A device including: a case; a chart plate mounted in the case for rotation about a substantially horizontal axis; drive means for rotating the chart plate, the chart plate being adapted to carry a stack of individual charts having central apertures and peripheral slots, said chart plate having a drive pin receivable in said peripheral slots and a central post receivable in said central apertures; freeing means operable by said drive means and disposed adjacent said chart plate for successively freeing upon a predetermined relative movement between said chart plate and said freeing means individual charts from a stack of charts carried by said chart plate from engagement with said post and said drive pin to fall by gravity in the case; said chart plate and said freeing means being movable relative to one another about the axis of the central post by said drive means; means operated by said drive means for actuating said freeing means to free charts from said plate; a chart receptacle mounted on the case and open at its upper end into the interior of the case and disposed to receive the charts from the chart plate;

and guide means in said case for guiding movement of the charts to the chart receptacle.

18. A device including: a case; a chart plate mounted in the case for rotation about a substantially horizontal axis; drive means for rotating the chart plate, the chart plate being adapted to carry a stack of individual charts having central apertures and peripheral slots, said chart plate having a drive pin receivable in said peripheral slots and a central post receivable in said central apertures; means operable by said drive means and disposed adjacent said chart plate for successively freeing upon a predetermined relative movement between said chart plate and said freeing means individual charts from a stack of charts carried by said chart plate from engagement with said post and said drive pin to fall by gravity in the case, said chart plate being mounted in said case for movement toward said last mentioned means; said chart plate and said freeing means being movable relative to one another about the axis of the central post by said drive means; means operated by said drive means for actuating said freeing means to free charts from said plate; and means for moving the chart plate toward said last mentioned means.

19. In combination: a stack of juxtaposed charts, each of said charts having a central aperture and a peripheral slot; a case; a chart plate mounted in the case for rotation about a substantially horizontal axis, said stack of charts being disposed on said chart plate, said chart plate having a drive pin receivable in said peripheral slots of said charts and a central post receivable in said central apertures of said charts, drive means for rotating the chart plate; a chart receptacle mounted on the case and open at its upper end into the interior of the case below the chart plate; means operable by said drive means disposed adjacent said chart plate for successively freeing upon a predetermined relative movement between said chart plate and said freeing means individual charts from said stack of charts from engagement with said post and said drive pin to move downwardly in the case and into said receptacle through its open upper end; said chart plate and said freeing means being movable relative to one another about the axis of the central post by said drive means; and means operated by said drive means for actuating said freeing means to free charts from said plate.

References Cited in the file of this patent

UNITED STATES PATENTS

| | | |
|---|---|---|
| 851,251 | Powell et al. | Apr. 23, 1907 |
| 1,099,409 | Vandiver | June 9, 1914 |
| 1,720,148 | Rodanet | July 9, 1929 |
| 2,068,449 | Downs | Jan. 19, 1937 |
| 2,703,745 | Smith | Mar. 8, 1955 |
| 2,739,031 | Meer | Mar. 20, 1956 |

FOREIGN PATENTS

| | | |
|---|---|---|
| 646,988 | Great Britain | Dec. 6, 1950 |